United States Patent [19]

Toyoda et al.

[11] Patent Number: 5,047,886
[45] Date of Patent: Sep. 10, 1991

[54] THIN-FILM MAGNETIC HEAD

[75] Inventors: Atsushi Toyoda; Shuichi Sawada, both of Hamamatsu, Japan

[73] Assignee: Yamaha Corporation, Hamamatsu, Japan

[21] Appl. No.: 495,711

[22] Filed: Mar. 19, 1990

[30] Foreign Application Priority Data

Mar. 20, 1989 [JP] Japan ................................ 1-68611

[51] Int. Cl.⁵ ............................ G11B 5/31; G11B 5/23
[52] U.S. Cl. .................................... 360/126; 360/120
[58] Field of Search ................................ 360/126, 120

[56] References Cited

U.S. PATENT DOCUMENTS

| | | | |
|---|---|---|---|
| 4,636,897 | 1/1987 | Nakamura et al. | 360/120 |
| 4,652,954 | 3/1987 | Church | 360/120 |
| 4,816,946 | 3/1989 | Kira et al. | 360/120 |
| 4,819,112 | 4/1989 | Iwata et al. | 360/126 |
| 4,841,402 | 6/1989 | Imanaka et al. | 360/126 |
| 4,881,144 | 11/1989 | Yuito et al. | 360/126 |

Primary Examiner—Robert S. Tupper
Attorney, Agent, or Firm—Burns, Doane, Swecker & Mathis

[57] ABSTRACT

A thin-film magnetic head is constructed by a lower core, a first insulating layer, a gap layer, a plurality of coil conductor layers, a plurality of insulating layers and an upper layer. The coil conductor layers are respectively embedded in the insulating layers. Each of the coil conductor layers is spirally formed on the gap layer, and the coil conductor layers are sequentially piled up on the gap layer. The gap layer is formed on the first insulating layer which coats and insulates the lower core. Then, an edge portion is formed by sandwiching the first insulating layer and the gap layer between the lower and upper cores. The first insulating layer whose shape affects the writing/reading efficiency of the thin-film magnetic head is protected by the gap layer. Preferably, the gap layer is formed by coating $Al_2O_3$ film or $SiO_2$ on the first insulating layer.

2 Claims, 1 Drawing Sheet

THIN-FILM MAGNETIC HEAD

BACKGROUND OF THE INVENTION

1. Field of the Invention

The present invention relates to a thin-film magnetic head which is suitable for an external magnetic storage unit of a computer system and the like.

2. Prior Art

Conventionally, in order to raise S/N ratio of a reproduced signal, number of coil conductors of the magnetic head is required to be increased. However, when sufficient number of the coil conductors are to be embedded in one layer, length of a core should be elongated so that a writing/reading efficiency is deteriorated. For this reason, the prior art employs a multilayer structure for making the coil conductors in general.

FIG. 1 is a sectional view showing the conventional thin-film magnetic head, wherein the coil conductor is constructed by four layers. In FIG. 1, 1 designates a lower core formed by an alloy material such as Ni-Fe alloy, and 2 designates a gap layer. This gap layer 2 is formed by forming $Al_2O_3$ film (i.e., alumina film) or $SiO_2$ film (i.e., silicone oxide film) based on sputtering method. This gap layer 2 forms a gap G of a thin-film magnetic head H. In addition, 3 designates an insulating layer which is formed by heating a resist for 30 minutes at a temperature of 230 degrees Celsius. Further, 4a designates a first coil conductor layer which is spirally formed on the insulating layer 3; 4b designates a second coil conductor layer; 4c designates a third coil conductor layer; and 4d designates a fourth coil conductor layer. Furthermore, 3a, 3b, 3c, 3d designate insulating layers which respectively insulate and coat the above-mentioned coil conductor layers 4a, 4b, 4c, 4d. 5, 6 designate upper cores each of which is formed by Ni-Fe alloy material.

Then, an edge portion of the thin-film magnetic head (left in FIG. 1) is formed by sandwiching the insulating layer and gap layer between the lower and upper cores. "A" in FIG. 1 designates an edge position of the insulating layer 3, and this edge position A is called "zero throat height position", i.e., this is a position where a throat height is zero. Such throat height, namely gap depth, is a distance from the edge position A to the edge B of the upper and lower poles of the cores. If the throat height deviates from the designed value, the magnetic efficiency of the magnetic head will be significantly deteriorated.

Since the above-mentioned thin-film magnetic head as shown in FIG. 1 has the multilayer structure, the insulating layer 3 is easily affected by the process of forming the upper layers on the insulating layer 3. Particularly, since the resist which forms the insulating layer 3 is made by organic material, the resist is easily affected by resist stripper or ion-milling process to be executed when forming the coil conductor layers 4a-4d. Thus, the edge position A of the insulating layer 3 having important functions as determining the throat height which is a distance from the edge B of the poles may be partially eroded by some micro-meters. In addition, surface of the insulating layer 3 becomes rough or partially peels from the gap layer 2. For such reasons, the edge portion can neither be formed in the designed scale nor in the designed position, which deteriorates the writing/reading efficiency. Meanwhile, plenty of thin-film magnetic heads are simultaneously formed from one wafer, however, the scaling precision of the edge portion may be deviated.

SUMMARY OF THE INVENTION

It is accordingly a primary object of the present invention to provide a thin-film magnetic head whose edge position, i.e., zero throat height position can be formed without any dispersion in its position.

In an aspect of the present invention, there is provided a thin-film magnetic head comprising:
(a) a lower core;
(b) a first insulating layer formed on the lower core;
(c) a gap layer which coats the first insulating layer;
(d) a plurality of coil conductor layers each of which is spirally formed, the plurality of coil conductor layers being sequentially piled up on the gap layer;
(e) a plurality of insulating layers which respectively coat the plurality of coil conductor layers; and
(f) an upper core which coats the plurality of insulating layers,
whereby the first insulating layer and the gap layer are sandwiched between the lower core and the upper core so that an edge portion is formed.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF A PREFERRED EMBODIMENT

Figure 1:
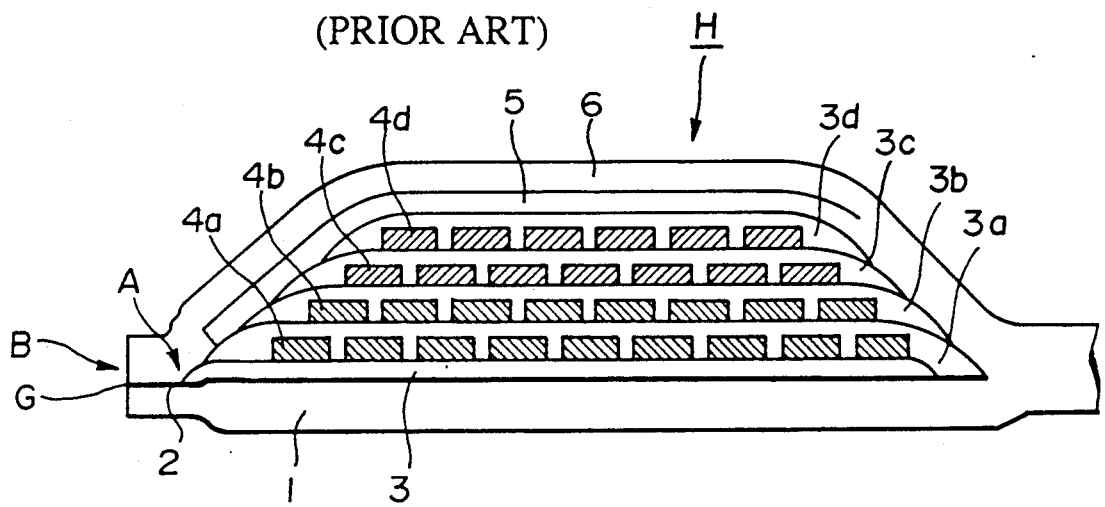
FIG. 1 is a sectional view showing the conventional thin-film magnetic head.
Figure 2:
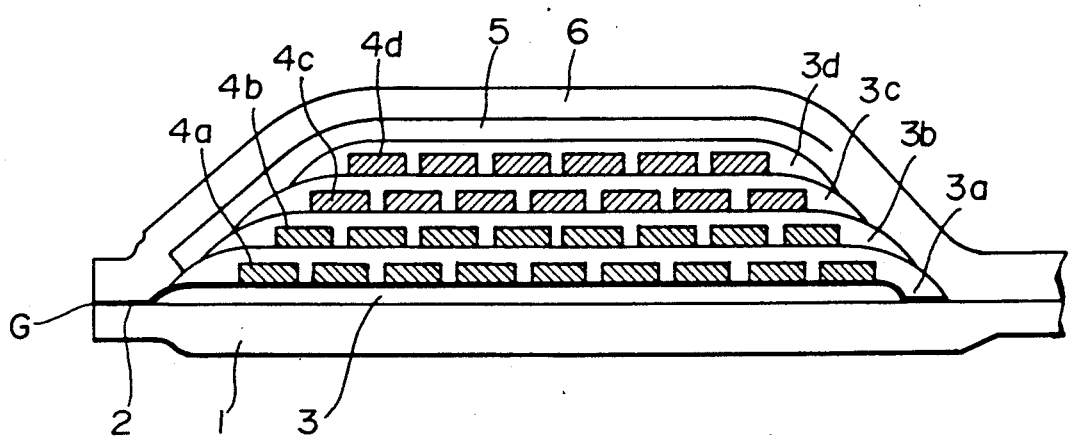
FIG. 2 is a sectional view showing a thin-film magnetic head according to an embodiment of the present invention.

Next, description will be given with respect to the thin-film magnetic head according to an embodiment of the present invention by referring to FIG. 2. In FIG. 2, parts identical to those of FIG. 1 will be designated by the same numerals.

In FIG. 2, 1 designates the lower core made of Ni-Fe alloy materials; 3 designates the insulating layer formed on the lower core 1; 2 designates the gap layer formed by coating $Al_2O_3$ film or $SiO_2$ film, which are hardly affected by the resist stripper or ion-milling process, on the insulating layer 3. In addition, 4a designates the first coil conductor layer which is spirally formed on the gap layer 2; and 4b, 4c, 4d respectively designate second, third, fourth coil conductor layers. Further, 3a designates the insulating layer which insulates and coats the first coil conductor layer 4a; and 3b, 3c, 3d designate the insulating layers which respectively insulate and coat the coil conductor layers 4b, 4c, 4d. Furthermore, 5, 6 designate the upper cores made of Ni-Fe alloy materials.

The difference between the prior art and present embodiment is the position of the gap layer 2 to be formed. More specifically, the gap layer 2 is formed between the lower core 1 and the insulating layer 3 in the prior art shown in FIG. 1, while the insulating layer 3 is formed on the lower core 1 and the gap layer 2 made by $Al_2O_3$ film is formed on the insulating layer 3 in the present embodiment. This $Al_2O_3$ film protects the insulating layer 3 when the coil conductor layers 4a-4d and insulating layers 3a–3d are formed on the gap layer 2. Thus, the insulating layer 3 is not affected by the process of forming these layers 4a–4d, 3a–3d.

For the above-mentioned reason, the present invention can form the edge portion of the thin-film magnetic head in accordance with the designed position and size with accuracy when making plenty of thin-film magnetic heads from the wafer, so that the writing/reading efficiency can be raised in the present invention as comparing to that of the prior art.

Lastly, this invention may be practiced or embodied in still other ways without departing from the spirit or essential character thereof. For instance, the gap layer 2 can be made by any film materials other than $Al_2O_3$, $SiO_2$. Therefore, the preferred embodiment described herein is illustrative and not restrictive, the scope of the invention being indicated by the appended claims and all variations which come within the meaning of the claims are intended to be embraced therein.

What is claimed is:

1. A thin-film magnetic head including an edge portion comprising:
   (a) a lower core;
   (b) a first insulating layer partially coating said lower core;
   (c) a gap layer which coats said first insulating layer;
   (d) a plurality of coil conductor layers each of which is spirally formed, said plurality of coil conductor layers being sequentially piled up on said gap layer;
   (e) a plurality of insulating layers which respectively coat said plurality of coil conductor layers, wherein at least one of said plurality of insulating layers partially coats said gap layer; and
   (f) an upper core which coats said plurality of insulating layers,
   wherein said edge portion is formed by an uncoated portion of said lower core which is not coated by said first insulating layer, and corresponding parts of said gap layer and said upper core.

2. A thin-film magnetic head according to claim 1 wherein said gap layer is formed by coating $Al_2O_3$ film or $SiO_2$ film on said first insulating layer.

* * * * *